(12) United States Patent
Mishra et al.

(10) Patent No.: US 10,209,962 B2
(45) Date of Patent: Feb. 19, 2019

(54) RECONSTRUCTING A HIGH LEVEL COMPILABLE PROGRAM FROM AN INSTRUCTION TRACE

(71) Applicant: International Business Machines Corporation, Armonk, NY (US)

(72) Inventors: Biplob Mishra, Bangalore (IN); Saritha Vinod, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 15/424,926

(22) Filed: Feb. 6, 2017

(65) Prior Publication Data

US 2018/0225096 A1    Aug. 9, 2018

(51) Int. Cl.
| | |
|---|---|
| *G06F 9/45* | (2006.01) |
| *G06F 8/30* | (2018.01) |
| *G06F 8/75* | (2018.01) |
| *G06F 8/41* | (2018.01) |
| *G06F 8/53* | (2018.01) |

(52) U.S. Cl.
CPC ............... *G06F 8/30* (2013.01); *G06F 8/41* (2013.01); *G06F 8/53* (2013.01); *G06F 8/75* (2013.01)

(58) Field of Classification Search
CPC ...................................... G06F 8/30; G06F 8/75
USPC ................................................ 717/106, 159
See application file for complete search history.

(56) References Cited

U.S. PATENT DOCUMENTS

| | | | | |
|---|---|---|---|---|
| 5,615,357 A | * | 3/1997 | Ball ..................... | G06F 11/3428 703/21 |
| 5,926,639 A | * | 7/1999 | Richardson ............. | G06F 8/433 714/E11.209 |
| 5,950,009 A | * | 9/1999 | Bortnikov ............... | G06F 8/445 712/214 |
| 6,006,033 A | * | 12/1999 | Heisch ................... | G06F 8/445 711/125 |

(Continued)

OTHER PUBLICATIONS

Framework for Instruction-level Tracing and Analysis of Program Executions; Sanjay Bhansali, Wen-Ke Chen, Stuart de Jong, Andrew Edwards, Ron Murray, Milenko Drinic, Darek Mihocka, Joe Chau—Microsoft Corporation, One Microsoft Way, Redmond, WA-VEE'06 Jun. 14-16, 2006.*

(Continued)

*Primary Examiner* — Francisco J Aponte
(74) *Attorney, Agent, or Firm* — Stephen J. Walder, Jr.; Bryan Bortnick

(57) ABSTRACT

Mechanisms are provided for generating a new compilable program from an instruction trace. The mechanisms receive a trace file for an original program whose execution on computing hardware has been traced and perform analysis of the trace file to identify a hot function, symbol information corresponding to the hot function, and initialization parameters for the hot function. The mechanisms generate a trace control flow graph based on the identified hot function and the symbol information corresponding to the hot function. The mechanisms identify, based on the trace control flow graph, pathways in the original program to the hot function, represented in the trace file. The mechanisms generate a reconstructed program based on the trace control flow graph, the pathways to the hot function, and the initialization parameters, and output the reconstructed program.

17 Claims, 5 Drawing Sheets

(56) References Cited

U.S. PATENT DOCUMENTS

| | | | | |
|---|---|---|---|---|
| 6,070,009 | A * | 5/2000 | Dean | G06F 11/3466 714/E11.2 |
| 6,189,141 | B1 * | 2/2001 | Benitez | G06F 8/443 714/E11.209 |
| 6,205,545 | B1 * | 3/2001 | Shah | G06F 9/3802 712/237 |
| 6,324,689 | B1 * | 11/2001 | Lowney | G06F 8/4442 717/154 |
| 6,353,924 | B1 * | 3/2002 | Ayers | G06F 11/3466 714/E11.2 |
| 6,381,739 | B1 * | 4/2002 | Breternitz, Jr. | G06F 8/443 714/37 |
| 6,470,492 | B2 * | 10/2002 | Bala | G06F 9/45504 714/E11.212 |
| 6,732,357 | B1 * | 5/2004 | Berry | G06F 11/3636 717/158 |
| 7,110,936 | B2 * | 9/2006 | Hiew | G06F 8/34 703/22 |
| 7,134,116 | B1 * | 11/2006 | Thekkath | G06F 11/3636 717/128 |
| 7,137,105 | B2 * | 11/2006 | Madsen | G06F 11/3466 717/128 |
| 7,194,732 | B2 * | 3/2007 | Fisher | G06F 11/3466 714/E11.2 |
| 7,213,126 | B1 * | 5/2007 | Smaus | G06F 9/3806 365/230.01 |
| 7,308,681 | B2 * | 12/2007 | Ekanadham | G06F 11/3471 714/E11.203 |
| 7,412,630 | B2 * | 8/2008 | Thekkath | G06F 11/3636 714/35 |
| 7,496,908 | B2 * | 2/2009 | DeWitt, Jr. | G06F 8/443 717/154 |
| 7,617,420 | B2 * | 11/2009 | Kimura | G06F 11/3636 714/45 |
| 8,037,450 | B2 * | 10/2011 | Goebel | G06F 11/3636 717/106 |
| 8,091,074 | B2 | 1/2012 | Lyon-Smith | |
| 8,266,608 | B2 * | 9/2012 | Hecht | G06F 11/3636 714/35 |
| 8,271,253 | B2 * | 9/2012 | Ward | G06F 17/504 703/14 |
| 8,352,928 | B2 * | 1/2013 | Kimura | G06F 8/443 717/128 |
| 8,549,498 | B2 * | 10/2013 | Hayashizaki | G06F 11/3612 717/148 |
| 8,583,967 | B2 * | 11/2013 | Walker | G06F 11/3636 714/45 |
| 8,584,083 | B2 | 11/2013 | Kettley et al. | |
| 2001/0003822 | A1 * | 6/2001 | Hibi | G06F 8/4442 718/100 |
| 2002/0104075 | A1 * | 8/2002 | Bala | G06F 9/45504 717/136 |
| 2003/0014741 | A1 * | 1/2003 | Megiddo | G06F 8/4441 717/158 |
| 2003/0101436 | A1 | 5/2003 | Kobrosly et al. | |
| 2007/0089095 | A1 * | 4/2007 | Thekkath | G06F 9/3836 717/128 |
| 2009/0222646 | A1 | 9/2009 | Ohba et al. | |
| 2009/0287729 | A1 * | 11/2009 | Chen | G06F 11/3676 |
| 2010/0083236 | A1 * | 4/2010 | Porto | G06F 9/45516 717/128 |
| 2010/0083237 | A1 * | 4/2010 | Kneebone | G06F 8/443 717/128 |
| 2010/0281460 | A1 * | 11/2010 | Tillmann | G06F 11/3612 717/106 |
| 2011/0138373 | A1 * | 6/2011 | Lane | G06F 8/443 717/157 |
| 2016/0357658 | A1 * | 12/2016 | Afram | G06F 11/3624 |

OTHER PUBLICATIONS

Tracing the Meta-Level: PyPy's Tracing JIT Compiler; Carl Friedrich Bolz and Antonio Cuni—ICOOOLPS '09 Genova, Italy 2009.*

An Abstract Interpretation-Based Framework for Control Flow Reconstruction from Binaries; Johannes Kinder, Florian Zuleger; and Helmut Veith—VMCAI'2009.*

Kwon, Yonghwi et al., "PIEtrace: Platform Independent Executable Trace", IEEE, Nov. 2013, pp. 48-58.

* cited by examiner

```
#include <stdio.h>
include <math.h> int average(int *arr,int n) {
  int sum=0, i=0, average;
  for(i=0; i<n; ++i)
  {
    sum+=arr[i];
  }
  average=sum/n;
  printf("Average = %d",average);
  return 0;
} int square_root(int *arr,int n) {
  int i=0;
  for(i=0; i<n; ++i)
  {
    arr[i] = sqrt(arr[i]);
  }
  average(arr, n);
  return 0;
} int square(int *arr,int n) {
  int i=0;
  for(i=0; i<n; ++i)
  {
    if (arr[i] > 10) {
       arr[i] = arr[i]*arr[i];
    }
    else {
       arr[i] = 0;
    }
  }
  return 0;
} void initialize(int *arr, int n )
{
  int i;
  for(i=0; i<n; ++i)
  {
    arr[i] = i;
  }
} int main(){
  int n, i;
  int num[100], sum=0, average;
  initialize(num, 100);
  square(num, 100);
  square_root(num, 100);
  return 0;
}
```

*FIG. 5A*

RECONSTRUCTING A HIGH LEVEL COMPILABLE PROGRAM FROM AN INSTRUCTION TRACE

BACKGROUND

The present application relates generally to an improved data processing apparatus and method and more specifically to mechanisms for reconstructing a high level compilable program from an instruction trace.

A computer architecture simulator, or an architectural simulator, is a piece of software to model computer devices (or components) to predict outputs and performance metrics on a given input. An architectural simulator can model a target microprocessor only (see instruction set simulator), or an entire computer system (see full system simulator) including a processor, a memory system, and I/O devices.

A full-system simulator is an architecture simulator that simulates an electronic system at such a level of detail that complete software stacks from real systems can run on the simulator without any modification. A full system simulator effectively provides virtual hardware that is independent of the nature of the host computer. The full-system model typically has to include processor cores, peripheral devices, memories, interconnection buses, and network connections. The defining property of full-system simulation compared to an instruction set simulator is that the model allows real device drivers and operating systems to be run, not just single programs. Thus, full-system simulation makes it possible to simulate individual computers and networked computer nodes with all their software, from network device drivers to operating systems, network stacks, middleware, servers, and application programs.

A cycle-accurate simulator is a computer program that simulates a microarchitecture on a cycle-by-cycle basis. In contrast, an instruction set simulator simulates an instruction set architecture usually faster but not cycle-accurate to a specific implementation of the architecture. Instruction set simulators (ISS's) are often used when emulating older hardware where time precisions are very important for legacy reasons. More often cycle-accurate simulators (CAS) are used when designing new microprocessors as they can be tested and benchmarked accurately (including running full operating system, or compilers) without actually building a physical chip, and allow for easily changing the architecture design many times to meet an expected plan. Cycle-accurate simulators must ensure that all operations are executed in the proper virtual (or real if it is possible) time—branch prediction, cache misses, fetches, pipeline stalls, thread context switching, and many other subtle aspects of microprocessors.

Instruction Set Simulator (ISS) is a methodology employed for one of several possible reasons including: (1) to simulate the machine code of another hardware device or entire computer for upward compatibility (a full system simulator typically includes an instruction set simulator, e.g., the IBM 1401 was simulated on the later IBM/360 through use of microcode emulation); (2) to monitor and execute the machine code instructions (but treated as an input stream) on the same hardware for test and debugging purposes; and (3) to improve the speed performance, compared to a slower cycle accurate simulator, of simulations involving a processor core where the processor itself is not one of the elements being verified.

An ISS is often provided with (or is itself) a debugger in order for a software engineer/programmer to debug the program prior to obtaining target hardware. The basic instruction simulation technique is the same regardless of purpose. First the monitoring program is executed passing the name of the target program as an additional input parameter. The target program is then loaded into memory, but control is never passed to the code. Instead, the entry point within the loaded program is calculated, and a pseudo program status word (PSW) is set to this location. A set of pseudo registers are set to what they would have contained if the program had been given control directly. It may be necessary to amend some of these to point to other pseudo "control blocks" depending on the hardware and operating system. It may also be necessary to reset the original parameter list to "strip out" the previously added program name parameter. Thereafter, execution proceeds as follows:

1. Determine the length of the instruction at pseudo PSW location (initially the first instruction in the target program). If this instruction offset within the program matches a set of previously given "pause" points, set "Pause" reason, go to step 7 below;
2. "Fetch" the instruction from its original location (if necessary) into the monitor's memory. If "trace" is available and "on", store program name, instruction offset and any other values;
3. Depending upon instruction type, perform pre-execution checks and execute. If the instruction cannot proceed for any reason (invalid instruction, incorrect mode etc.) go to step 7. If the instruction is about to alter memory, check memory destination exists (for this thread) and is sufficiently large. If OK, load appropriate pseudo registers into temporary real registers, perform equivalent move with the real registers, save address and length of altered storage if trace is "on" and go to step 4. If the instruction is a "register-to-register" operation, load pseudo registers into monitor's real registers, perform operation, store back to respective pseudo registers, go to step 4. If the instruction is a conditional branch, determine if the condition is satisfied: if not go to step 4, if condition is satisfied, calculate branch to address, determine if valid (if not, set error="Wild branch") and go to step 7. If OK, go to step 5. If instruction is an operating system call, do real call from monitoring program by "faking" addresses to return control to monitoring program and then reset pseudo registers to reflect call; go to step 4;
4. Add instruction length to current Pseudo PSW value;
5. Store next address in Pseudo PSW;
6. Go to step 1; and
7. Halt execution.

For test and debugging purposes, the monitoring program can provide facilities to view and alter registers, memory, and restart location or obtain a mini core dump or print symbolic program names with current data values. It could permit new conditional "pause" locations, remove unwanted pauses, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions which are executed by the at least one processor to specifically configure the at least one processor to implement one or more elements of a conversion engine that operates to perform the method. The method comprises receiving, by the conversion engine, a trace file for an original program whose execution on computing hardware has been traced and performing, by the conversion engine, analysis of the trace file to identify a hot function, symbol information corresponding to the hot function, and initialization parameters for the hot function. The method further comprises generating, by the conversion engine, a trace control flow graph based on the identified hot function and the symbol information corresponding to the hot function. In addition, the method comprises identifying, by the conversion engine, based on the trace control flow graph, pathways in the original program to the hot function, represented in the trace file. Moreover, the method comprises generating, by the conversion engine, a reconstructed program based on the trace control flow graph, the pathways to the hot function, and the initialization parameters, and outputting, by the conversion engine, the reconstructed program.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A-5D are example diagrams illustrating an example of operations performed by elements of the instruction trace to compilable program conversion engine in accordance with one illustrative embodiment.

DETAILED DESCRIPTION

Figure 1:
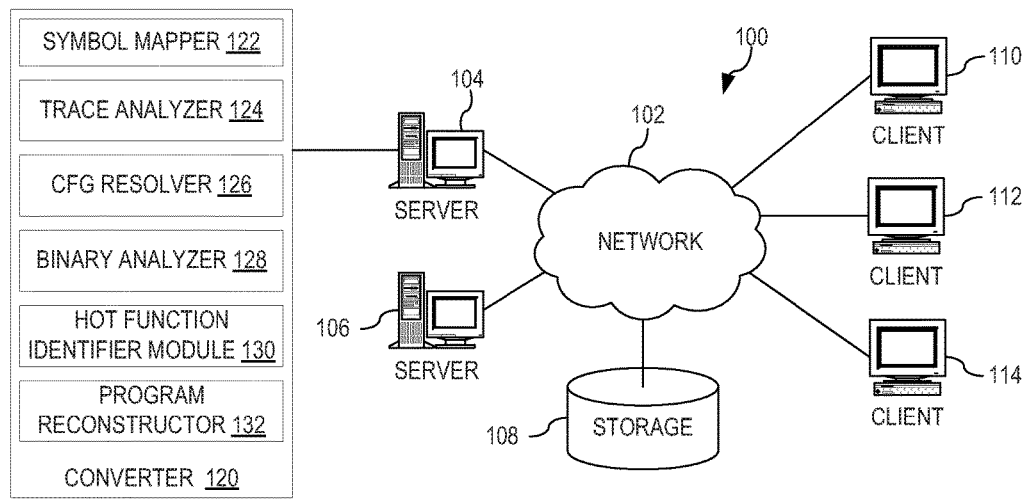
FIG. 1 is an example diagram of a distributed data processing system in which aspects of the illustrative embodiments may be implemented.

The illustrative embodiments provide mechanisms for reconstructing a high level program that is able to be compiled, i.e. "compilable", from an instruction trace. The illustrative embodiments recognize various issues associated with the use of instruction traces and simulators to analyze hardware and workload behavior. Modern day workloads are often analyzed on available hardware for determining optimizations for speeding up execution, providing compiler improvements, addressing bottlenecks, and the like. However, for design and performance analysis for future hardware, instruction traces of the workloads are collected. Instruction traces are also used for low level performance analysis for problem areas of the workloads. Instruction traces provide the sequence of instructions executed on the hardware and are a representation of the workload behavior.

These traces are consumed by cycle accurate simulators designed for analyzing hardware operations. These simulators run on an order of 10,000 instructions per second, which is far too slow compared to the actual execution speed of actual hardware. That is, modern workloads may have instruction path lengths of trillions of instructions. Running complete workloads on these simulators is not feasible as it would require a very long time and a large amount of resources to complete the simulation. To circumvent this problem instruction trace records of a small section of the actual run of the executable workload, such as 100s of millions of instructions, are collected as opposed to the complete workload. The particular portion of the workload from which the instruction trace is collected may be a previously identified problem area in question or a representative section of the workload, e.g., a representative section of a program whose execution on the hardware is being traced.

However, even these smaller instruction traces, when run on a simulator, may take a few hours to complete before critical statistics of the trace of the workload, such as clocks per instruction (CPI), branch mis-prediction statistics, cache miss statistics, and the like, are obtained. The simulators which consume these traces are an order of magnitude slow and the traces generated cannot be directly executed on hardware. This makes the analysis using instruction traces difficult and time consuming. However, it is often desirable to obtain a quick run, or execution, of these traces and obtain the critical statistics, which is not achievable using known methodologies and systems.

The illustrative embodiments provide mechanisms for constructing a compilable high level program from an instruction trace using trace control flow graph construction. The mechanisms of the illustrative embodiments take as input an instruction trace generated from a trace of a workload/program execution, and the original binary used for the instruction trace. From these inputs, a newly constructed program is generated that retains the characteristics of the instruction trace.

In accordance with one illustrative embodiment, a symbol mapper module converts the instruction addresses in the trace file to corresponding symbols in the actual program. A trace analyzer module takes the symbol information, generates a trace profile, and identifies one or more "hot functions" from the trace profile. A "hot function" is a function of the original code that is represented in the trace profile a predetermined number of times, e.g., a frequency of occurrence of the function in the trace profile equals or exceeds a predetermined threshold occurrence value. In some illustrative embodiments, a single "hot function" is identified as the function having the most occurrences in the trace profile, where the "hotness" of a function is indicated by the percentage of occurrences of the function within the trace, e.g., 25% of the function occurrences within the trace profile indicate function A. In other illustrative embodiments, a threshold may be established and all functions whose percentage of occurrence within the trace profile meet or exceed that threshold may be considered "hot functions" for purposes of the operations of the illustrative embodiments. The trace analyzer also performs a second pass analysis of the trace to identify and resolve the data dependencies of the hot function(s) and to derive the data required to initialize the host function(s) while reconstructing the program.

A control flow graph (CFG) resolver also takes the symbol information and constructs a control flow graph (CFG) of the trace into a sub-graph, where the sub-graph represents the control flow for a portion of the entire program that corresponds to the portion traced, and where a full graph would represent the control flow of the entire program. A binary analyzer module uses the binary and collects the symbol information including the functions used in the program. This is provided to the CFG resolver which constructs the CFG of the entire program, referred to herein as the full graph or full CFG. The full graph and the sub-graph are super-imposed to identify the paths to the hot function(s) in the trace such that the hot function(s) may be reconstructed and for which the trace analyzer provides the initialization data required for the hot functions(s).

A program reconstructor module re-constructs the new high level program using the hot function(s) information and also considering the initialization parameters captured by the trace analyzer module. That is, the program reconstructor creates the new program with the hot function based on the path information, initialization data, and the high level program source code of the original program. The constructed new program can then be compiled on any desired architecture and the resulting binary can be executed directly on the hardware. The execution characteristics of the new program will be similar to the characteristics exhibited by the hot function(s) in the trace and should provide similar metrics.

The resulting newly constructed high level program may be used in many different ways to achieve advantages not previously available from instruction traces. For example, the illustrative embodiments may be used to generate a newly constructed program from the instruction trace and original binary which is then used to perform trace and simulator validation of future hardware architectures. That is, simulators designed for future hardware are trace driven. On converting instruction traces to a compilable program through the mechanisms of the illustrative embodiments, the compilable program may be executed directly on the next generation hardware to analyze the instruction trace quality as well as to validate the simulator model. Moreover, when the trace is converted to a high level program using the mechanisms of the illustrative embodiments, the high level program may be compiled on any platform or architecture and hence, allows cross-platform analysis of the same program segments.

In other implementations, the mechanisms of the illustrative embodiments may be used to assist with the setup of complex workloads on newly available hardware. For a newly available hardware architecture, creating a setup for complex workloads is time consuming and also has dependencies on the ecosystem, i.e. software infrastructure required to use the new hardware. In such cases, to speed up the performance evaluation, the compilable program created by the illustrative embodiments, which is representative of the workload, can be utilized. Also, since the program is compilable, the program can be utilized with new compilers that generate a different/newer set of assembly instructions than the original program under trace, and thereby assist in the evaluation of these new compilers.

The conversion of an instruction trace to a compilable program, using the mechanisms of the illustrative embodiments, eliminates long execution time of instruction traces on simulators for performance and design evaluations. For example, the performance counter data of an instruction trace may be obtained from the newly constructed program and cross validated using the actual binary executed by the hardware architecture. The new program is much faster and light weight than the original binary, however it retains all the original characteristics of the hot function(s) in the trace.

The illustrative embodiments may further assist by improving debugging capabilities. In long running workloads, it is very difficult to reach the problem area and debug the program from that problem area. An instruction trace collected in the problem area can be converted, by the mechanisms of the illustrative embodiments, to an executable for problem analysis. For debugging or performance analysis, usage and availability of existing tools, that operate on the compiled program, is more extensive than for the instruction trace. Thus, by converting the instruction trace into a compilable program and then compiling the program into a binary code executable by the hardware, these debugging and performance analysis tools may be applied when they would otherwise not be available for use with just the instruction trace information.

As yet a further advantage offered by the mechanisms of the illustrative embodiments, the illustrative embodiments may be employed to eliminate or reduce the gap between simulator and hardware with regard to performance analysis. That is, simulator design for a particular hardware architecture is never fully accurate. Hence, when performance analysis is carried out on a simulator, rather than the hardware itself, a gap exists due to the inaccuracies in the simulation. With the conversion of an instruction trace to an executable program, via the mechanisms of the illustrative embodiments, the entire analysis can be carried out on the hardware, eliminating or reducing any performance analysis gaps.

It should be appreciated that, contrary to known mechanisms that are able to convert instruction traces to a binary program in assembly language by replacing register values and memory addresses in an original trace file to be executed on the same exact hardware architecture, such as described in U.S. Patent Application Publication No. 2003/0101436, the illustrative embodiments provide mechanisms for converting an instruction trace into a high level program that can be compiled and executed on any existing or future hardware architecture, including those that are different from the hardware architecture upon which the original program was executed to generate the instruction trace. The illustrative embodiments utilize function level mapping mechanisms for mapping the instructions executed based on control flow graphs. This means that the illustrative embodiments may be used to study and analyze the future micro architecture design and compiler design from the instruction traces that were captured for previous generations of hardware and compilers. The instruction trace information containing performance problems of complex workloads that were already isolated and analyzed in previous generations of hardware and/or compilers may be used to easily study the improvements in the new generation of hardware and/or compilers without significant setting up and analyzing of the complex workloads. Since the high level program generated by the illustrative embodiments is compilable, it can utilize new compilers that generate a different set of assembly instructions, which is not possible with the system described in U.S. Patent Application Publication No. 2003/0101436.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

As the illustrative embodiments are directed to mechanisms for converting an instruction trace and original binary into a high level compilable program, the illustrative are specifically directed to solving a computer based problem in a computing environment. Thus, elements of the illustrative embodiments may be provided as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
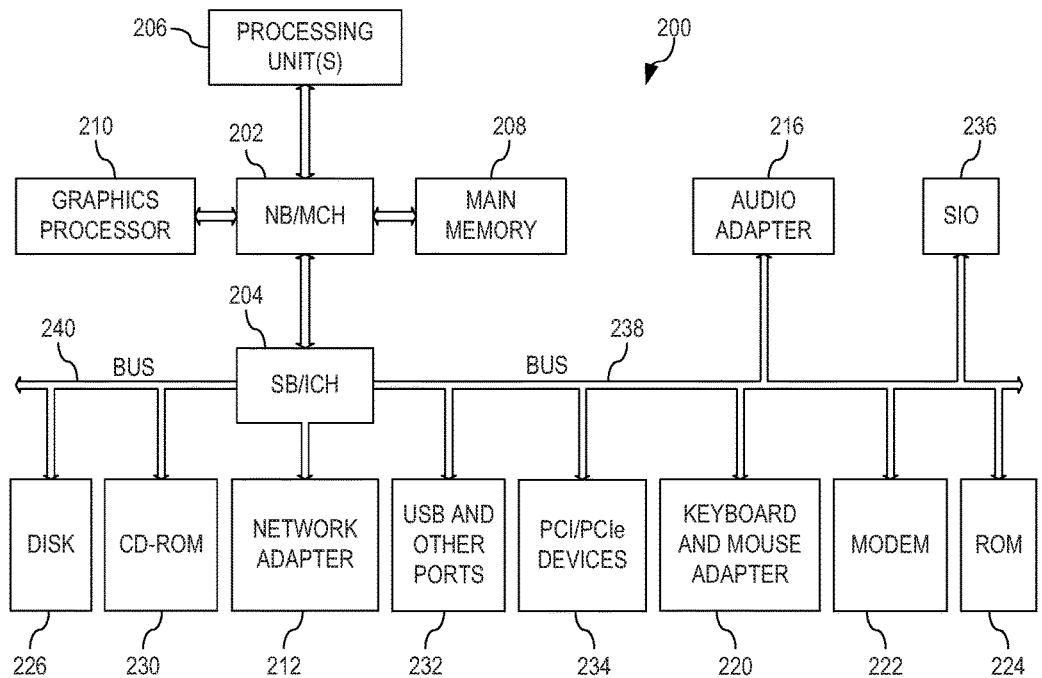
FIG. 2 is an example block diagram of a computing device in which aspects of the illustrative embodiments may be implemented.

As mentioned above, the illustrative embodiments are specifically directed to solving issues associated with instruction traces and their utilization when testing and analyzing new computing hardware architectures and/or compilers. As such, the illustrative embodiments may be utilized in many different types of computing, or data processing, environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an instruction trace to compilable program conversions engine 120. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the conversion of an instruction trace and original binary used to generate the instruction trace, into a compilable program that may be used in the same or other hardware architectures and/or with the same or other compilers, to test the operation of these hardware architectures/compilers while maintaining the characteristics of the original trace.

As shown in FIG. 1, the instruction trace to compilable program conversion engine 120, hereafter referred to simply as the conversion engine or "converter" 120, comprises a symbol mapper 122, a trace analyzer 124, a control flow graph (CFG) resolver 126, binary analyzer 128, a hot function identifier module 130, and a program reconstructor 132. These elements may be implemented as software executing on one or more processors of a specifically configured computing device, specifically configured hardware that is specifically configured to perform the functions of one or more of the various elements 122-132, or any combination of software and hardware. Moreover, while the depicted example assumes that the elements of the conversion engine or converter 120 are implemented on a single computing device or data processing system, it should be appreciated that the elements may be distributed across a plurality of computing device or data processing systems depending on the desired implementation. In one illustrative embodiment, the computing device or data processing system is a server computing device, although the mechanisms of the illustrative embodiments may also be implemented on a client computing device or a combination of servers and/or client computing devices.

The symbol mapper 122 provides logic for mapping instruction addresses to corresponding symbols in a program. That is, the symbol mapper 122 takes as an input the instruction trace, or trace file, generated from a workload/program execution, and the original binary used for the program execution. The trace file is generated by running the program in a simulator and capturing the instructions executed by the processor while running the program. The trace file contains the instruction addresses and opcodes for at least one selected section of the executed program, i.e. in most cases, only a selected section of the executed program is captured in the instruction trace or trace file. The symbol mapper 122 takes the trace file and maps each instruction address in the trace file to corresponding symbols in the actual program using a symbol table in the original binary, i.e. the symbol table in the binary maps instruction addresses to corresponding symbols in the original program code.

The trace analyzer 124 provides logic for performing analysis of trace information, and the symbol information from the symbol mapper 122, to generate a trace profile and, potentially in combination with the hot function identifier module 130, identify the hot function(s) from the trace profile. It will be assumed for purposes of the following description that a single hot function is identified by the trace analyzer 124. This single hot function is a function that has the highest percentage of references to that function in the trace information. However, as noted previously, the illustrative embodiments may operate on a plurality of hot functions where each function has a percentage of references in the trace information that meets or exceeds a predetermined threshold value. Alternatively, in other illustrative embodiments, a predetermined number of the highest percentages of references may be selected as hot functions, e.g., the top 5 ranking functions based on percentage of references in the trace information. Any methodology for selecting the "hot functions" whose execution characteristics are to be exhibited in a reconstructed new compilable program may be used without departing from the spirit and scope of the illustrative embodiments or present invention. In addition, the trace analyzer 124 also analyzes the original source code and identifies the program constructs of the hot function. The trace analyzer 124 analyzes the trace and identifies the variables of interest and the register contents captured as part of the trace records which are used to initialize the identified variables/memory for the reconstruction of the hot functions in the new program reconstruction.

The hot function identifier module 130, which is shown separately in FIG. 1 but may also be integrated into the trace analyzer 124, for example, provides logic for determining hot functions within the trace file for use in reconstructing a program from an instruction trace. The hot function identifier module 130 may identify one or more hot functions in the trace file or instruction trace based on a hot function metric. In some illustrative embodiments, this hot function metric may be a percentage of references to the function in the trace file or instruction trace. In other illustrative embodiments, the hot function metric may be a raw number of references to the function. In other illustrative embodiments, other metrics may be utilize that identify one or more functions in the trace file or instruction trace that may be more representative of the execution characteristics of the traced portion(s) or segment(s) of the program than other traced portion(s) or segment(s) of the program. In some illustrative embodiments, one or more threshold values for the hot function metric may be predetermined and used to compare against the hot function metric values generated for each function in the trace file or instruction trace to identify which functions should be considered hot functions, e.g., those functions whose hot function metric equals or exceeds a threshold value may be considered to be a hot function. For purposes of illustration only, the examples provided herein assume a single hot function is determined as the function in the trace file or instruction trace that has a highest percentage of references to the function (the hot function metric) in the trace file or instruction trace.

The control flow graph (CFG) resolver 126 provides logic for generating a control flow graph (CFG) of an instruction trace into a sub-graph based on the symbol information generated by the symbol mapper 122. The CFG resolver 126 also provides logic for generating a control flow graph of the entire program (i.e. a full graph) based on program function information obtained from the original binary by the binary analyzer 128. Control flow graph construction tools are generally available that provide a CFG for an entire program. The mechanisms of the illustrative embodiment also utilize the symbol information and dynamic call sequence represented in the trace file into a sub-graph for the selected segments of the program that are part of the instruction trace (as noted above, traces often are directed to only selected segments or portions of the program rather than the entire program).

The program reconstructor 132 provides the logic for reconstructing a high level program using the sub-graph and full graphs generated by the CFG resolver 126. The program reconstructor 132 identifies the paths to the host function(s) identified by the hot function identifier module 130 via a super-imposing of the sub-graph on the full graph and identifies the initialization parameters/memory contents captured by the trace analyzer 124 that are required for the hot function(s). The program reconstructor 132 then creates the new program with the host function(s) based on the path information, initialization data, and the high level program source code.

Thus, the mechanisms of the illustrative embodiments utilize specifically configured computing devices, or data processing systems, to perform the operations for implementing the converter 120. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the a instruction trace to compilable program converter, such as converter 120 in FIG. 1.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
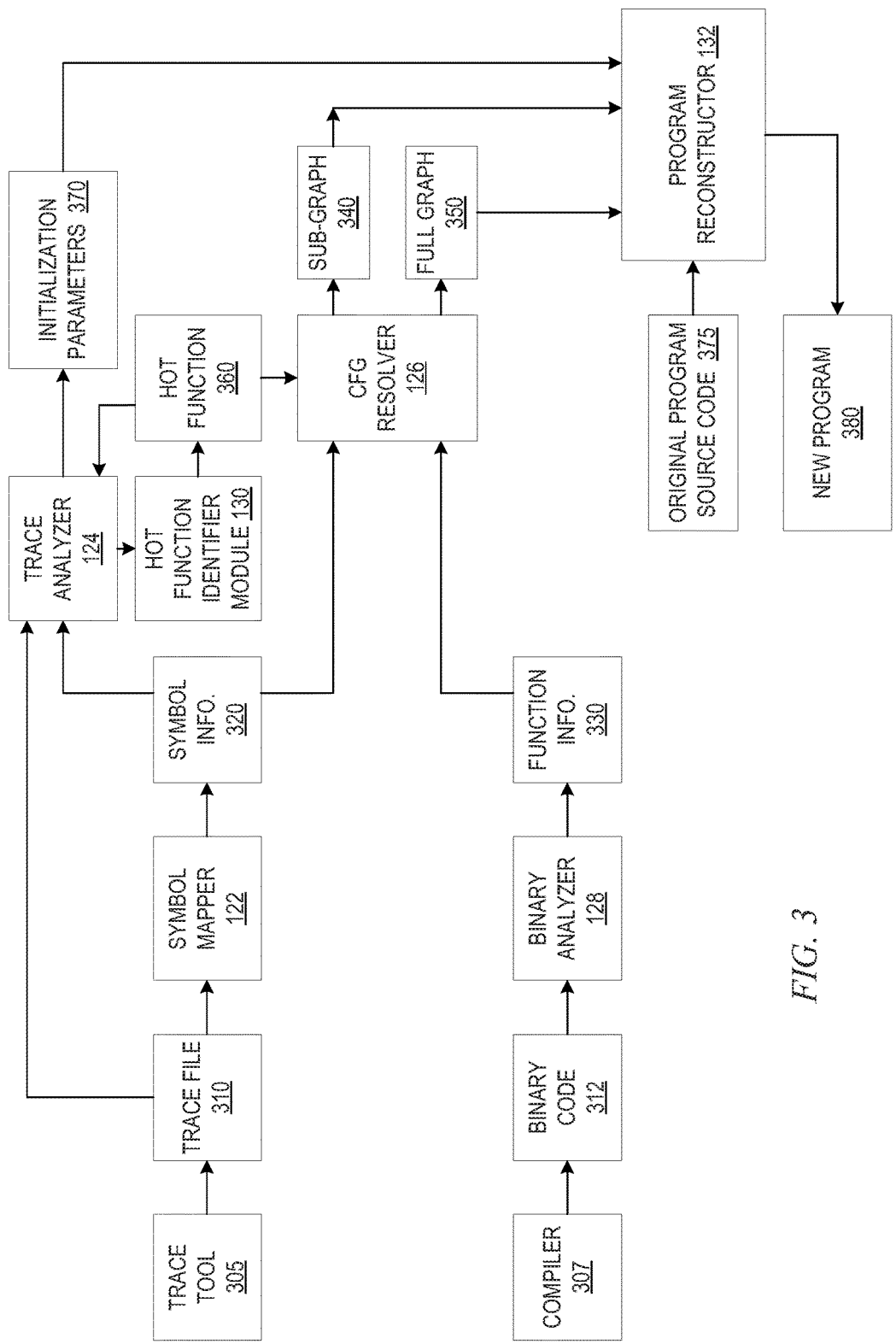
FIG. 3 is an example block diagram of an instruction trace to compilable program converter in accordance with one illustrative embodiment.

FIG. 3 is an example block diagram of an instruction trace to compilable program converter in accordance with one illustrative embodiment. The elements shown in FIG. 3 are similar to those of the converter 120 in FIG. 1 and thus, are depicted with similar reference numerals.

As shown in FIG. 3, the converter 120 takes as an input, an instruction trace, or trace file 310, generated from a trace tool 305 tracing a workload/program execution and the original binary 312 used for the program execution that was traced. The compiling of a computer program, by a compiler 307, into a binary code 312 for execution, as well as trace tools 305 used to perform instruction traces and generate a trace file 310 are generally known in the art and thus, a more detailed description is not provided herein. The illustrative embodiments may be implemented with any trace tool 305 and/or compiler 307 that provides a trace file 310 and binary code 312 as input to the converter 120.

The trace file 310 and binary code 312 are provided as inputs to the converter 120 with the trace file 310 being operated on by the symbol mapper 122 and the compiled binary code 312 being operated on by the binary analyzer 128, potentially in parallel if desired by the particular implementation. The symbol mapper 122 takes the trace file 310 and converts the instruction addresses in the trace to corresponding symbols in the actual program, such as by using a symbol table in the original binary code 312, to thereby generate symbol information 320. The symbol information 320 is provided to the trace analyzer 124 which uses the symbol information and generates a trace profile based on the symbol information, where the trace profile comprises various information regarding the instructions executed during the trace, their corresponding symbols, and other metric information regarding the trace. The trace profile may include as part of the metrics of the trace profile, a hot function metric value for each function represented in the trace file 310 or instruction trace. For example, the hot function metric value may be a count of a number of times the corresponding function is represented in the trace file 310. This hot function metric value may itself be, or may be used to calculate, a hot function metric that may be used to determine whether the function should be considered a hot function for program reconstruction. For example, the hot function metric values for the functions may be used to calculate a percentage of occurrence of references to the function in the trace file 310.

The hot function identifier module 130, which may be integrated in the trace analyzer 124 or provided as separate logic, identifies the hot function 360 from the trace profile. The trace analyzer 124 also performs a second pass analysis of the trace file 310 to identify the program constructs of the hot function 360 within the trace file 310 and collects information required for initializing these constructs while reconstructing the program from the trace file 310. For example, the trace analyzer 124 may analyze the trace file 310 based on the symbol information 320 to variables, and register values associated with these variables, referenced in the hot function 360.

The CFG resolver 126 also receives the symbol information 320 from the symbol mapper 122 and constructs a control flow graph (CFG) of the trace in the trace file 310 into a sub-graph 340. The control flow graph is a representation, using graph notation, of all paths that may be traversed through a program during its execution, where each node represents a function and edges represent the function call connections of the control flow. By analyzing the symbol information 320 for the trace file 310, the calls and returns between functions of the original program may be identified and used to identify nodes and edges of the sub-graph 340 and full graph 350.

The compiled binary code 312 of the original program is input into the binary analyzer 128. The binary analyzer 128 uses the binary 312 and collects symbol information including the functions used in the program. This function information 330 is provided to the CFG resolver 126, which constructs a control flow graph of the entire program. The sub-graph 340 of the trace file 310 is superimposed onto the complete CFG 350 of the original program generated by the CFG resolver 126 based on the function information 330, to identify the various calls to the hot function 360 that is to be reconstructed by the program reconstructor 132.

The program reconstructor 132 reconstructs the new high level program 370 using the sub-graph 340, full graph 350, initialization parameters 370, and original program source code 375. The program reconstructor 132 uses the sub-graph 340 and full graph 350 to identify the paths to the hot function identified by the hot function identifier module 130, e.g., all of the possible paths in the full graph 350 that go to the sub-graph 340 which represents the hot function 360 as a smaller CFG than the full graph 350. This path information is used by the program reconstructor 132 to identify the different invocations of the hot function through multiple paths. The program reconstructor 132 may utilize an object dump (objdump) of the binary, or other generated data structure that identifies the function information/instructions of the binary, to obtain the actual instructions to be executed on the data processing system. For example, "objdump" is a command in Linux which may be run on a compiled binary program, such as by the binary analyzer 128, to obtain the function information/instructions of the binary program 312. This is one example of a tool that may be used to obtain static information of a compiled binary program 312. The CFGs, however, are determined based on dynamic run characteristics of the binary program 312 and make use of the function information 330 contained in the binary program 312.

The program reconstructor 132 further utilizes the initialization parameters 370 provided by the trace analyzer 124 to generate an initialization routine in the reconstructed program that initializes the variables and memory contents to the correct state to reconstruct the portions of the original program that include the hot function and paths to the hot function. Thus, the new program 380 generated by the program reconstructor 132 based on the identification of the hot function 360, the creation of the full graph 350 for the original program and the sub-graph 340 for the hot function, and the identification of the initialization parameters 370 for the hot function 360, comprises the hot function, portions of the original program that invoke the hot function, and an initialization routine or function. Other portions of the original program that are not on a path to the hot function are not included in the new program 380.

It should be noted that the program reconstructor 132 uses the contents of the hot function(s) from the original binary's source code 375 and the reconstruction performed by the program reconstructor 132 occurs at a high level source code level. For example, the mechanisms of the illustrative embodiments understand "square" is the hot function to be reconstructed. The implementation of this "square" function is obtained from the original program source 375. On top of this, the program reconstructor 132 determines, such as from CFG superimposition of the sub-graph 340 on the full graph 350, that the only call to the hot function "square" is from the "main" in this example. The trace analyzer 124 output is used for data initialization to drive the square function while retaining the similar dynamic characteristics as was in the trace.

The constructed new program 380 is able to be compiled on any hardware architecture and the resulting binary can be executed directly on the hardware. The execution characteristics of the new program 380 are similar to the characteristics exhibited by the trace represented in the trace file 310 and should provide similar metrics when run on the new hardware architecture. Moreover, the new program 370 may be compiled by any other compiler, such as a new compiler providing new binary constructs. The new program 380 may also be used to debug a problem section or replicate a program code section where the compiler is not generating optimized code, if the trace file 310 was collected around these problem code sections. The new program 380 can be analyzed readily to solve these problems.

It should be appreciated that the constructed new program 380 generated by the program reconstructor 132 may be significantly smaller in size than the original program as the new program 380 focuses on the hot function(s) in the trace file 310. For example, the original program may have trillions of total instructions, whereas a trace may contain typically a few million instructions. This trace, when reconstructed into a new program, contains the sections of the original program that are determined to be hot functions or pathways to the hot function. Since the new program 380 is considerably smaller in size, i.e. number of instructions, than the original program, the installation of the new program 380 is much easier than the original program, i.e. the new program 380 is much easier to port, run and debug, and analyze for performance problems on new hardware.

Figure 4:
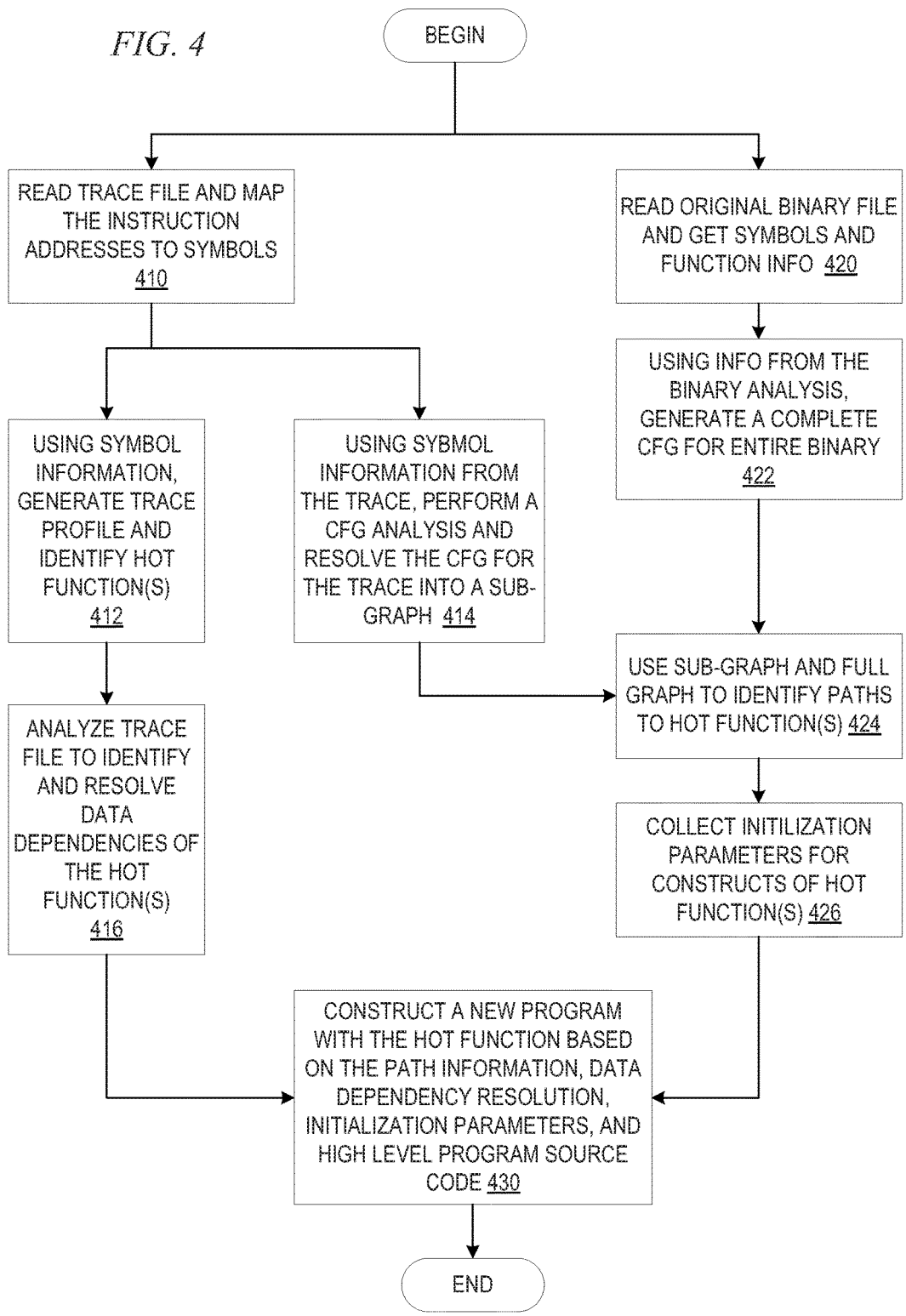
FIG. 4 is a flowchart outlining an example operation of an instruction trace to compilable program converter in accordance with one illustrative embodiment.

FIG. 4 is a flowchart outlining an example operation of an instruction trace to compilable program converter in accordance with one illustrative embodiment. The operation outlined in FIG. 4 may be implemented by a converter, such as converter 120 in FIGS. 1 and 3 for example, with individual steps being performed by corresponding elements of the converter as discussed previously. The operation assumes that an original program has been compiled to generate an original binary file and that a trace of the original program's execution on an original hardware architecture has been performed to generate a trace file. In some illustrative embodiments, parallel paths of execution are followed in which the trace file is processed and the original binary file is processed, e.g., steps 410-416 being a first execution path and steps 420-426 being a second execution path with some overlap of the paths at steps 414-426.

As shown in FIG. 4, following the trace file processing path starting at step 410, the trace file is read and instruction addresses are mapped to symbols (step 410). Using the symbol information generated by the symbol mapping, and the trace file input, the trace file is analyzed to generate a trace profile and identify one or more hot functions from analysis of the trace profile (step 412). The trace file is analyzed to identify and resolve data dependencies of the hot function(s) (step 416).

That is, in most cases, a compiled binary program needs data to run. Different data can result in executions of different paths of the same compiled program. Thus, for reconstruction of a hot function in a program, where the reconstructed program depicts the same behavior as the original program, it is crucial to recreate the data accurately. In the "square" function of the running example, there is a condition based on the data value and depending on the condition being "true" or "false" different code sections would be executed. Thus, the trace analyzer reconstructs the data values by analyzing the trace records, obtains the necessary register contents, and maps the register contents to the array/variable in an initialization function in the reconstructed program. Some of the initialization parameters which are not dynamic may be directly obtained from original source program, e.g., #defines, external variables, etc.

In addition to the analysis of the trace file to identify and resolve data dependencies of the hot function(s) (step 416), the symbol information generated based on the trace file is used to perform a control flow analysis and resolve a CFG for the trace into a sub-graph corresponding to the hot function(s) (step 414).

With regard to the original binary file execution path, the original binary file is read and the symbols and function information for the binary file are obtained (step 420). Using information from the binary analysis, a complete control flow graph (CFG) is generated for the entire binary file (step 422). The trace sub-graph and the complete CFG of the binary file (full graph) to identify the paths to the hot function(s) (step 424). In addition, initialization parameters for the program constructs, e.g., loop counts and the like, in the hot functions are collected (step 426) and a new high level program code is generated based on the path information, data dependency resolution, initialization parameters, and high level program source code (step 430). The operation then terminates.

While the operation terminates in FIG. 4, it should be appreciated that the resulting new high level program code may be provided to a compiler, either the same or different compiler used to generate the original binary code, for compilation and execution on the same or different hardware architecture that was used to generate the trace file. In this way, the new high level program code may be used to test and analyze new hardware configurations and/or new compiler operations.

Figure 5B:
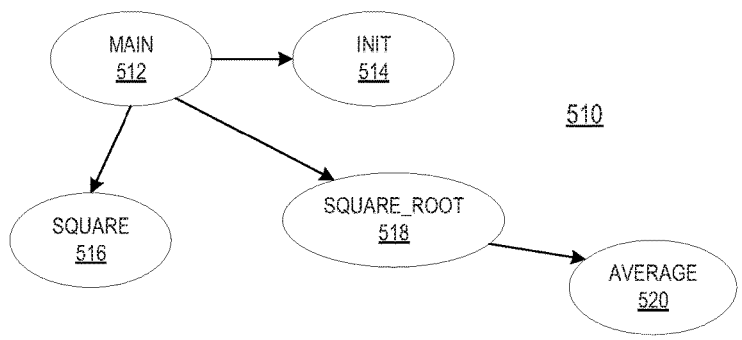
Figure 5C:
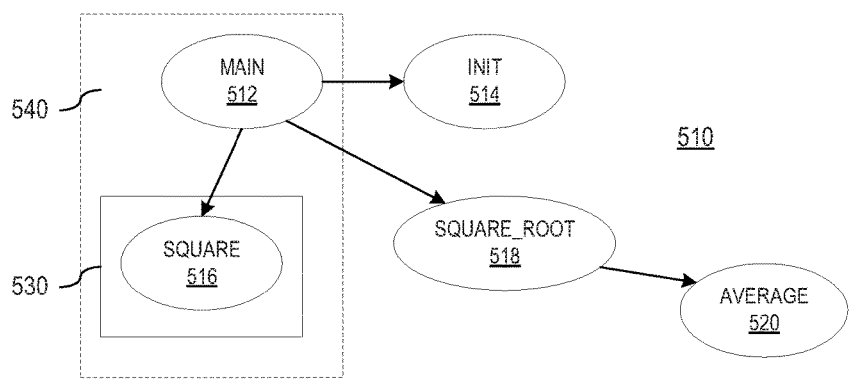

FIGS. 5A-5D are example diagrams illustrating an example of operations performed by elements of the instruction trace to compilable program converter in accordance with one illustrative embodiment. In particular FIG. 5A illustrates an example of a snapshot of original code from which a binary file and corresponding trace file of an execution of the binary code on a hardware architecture may be generated.

The instruction trace, or trace file, from the workload/program execution of the original code in FIG. 5A is input to the converter 120 along with the original binary code generated for the original code. The trace file is generated, for example, by running the program in a simulator and capturing the instructions executed by the processor while running the program. The trace file contains the instruction addresses and corresponding opcodes. In most cases, only a selected section of the executed program is captured in the instruction trace or trace file. In addition, the binary code for the original code may include a symbol table that correlates addresses to symbols in the original code. For example, for an instruction trace of the "square" function in FIG. 5A, a symbol table entry of "0x10000934 . . . square". The symbol table may be used by the symbol mapper 122 to correlate trace file 310 address information to corresponding symbols for use by the trace analyzer 124 and CFG resolver 126.

The CFG resolver 126 takes the symbol information generated by the symbol mapper 122 and constructs a CFG of the trace file 310 into a sub-graph 340. The CFG resolver 126 also generates a full graph 350 for the entire program based on function information 330 generated by a binary analyzer 128 operating on the binary code 312 corresponding to the original program. FIG. 5B illustrates a control flow graph (CFG) for the entire snapshot of original code shown in FIG. 5A as may be generated by the CFG resolver from the binary file 312. As shown in FIG. 5B, the CFG 510 for the entire snapshot of original code comprises a node 512 for the main function code block, a node 514 for the initialization function or code block, a node 516 for the "square" function or code block, a node 518 for the "square_root" function or code block, and a node 520 for the "average" function or code block. The edges between the nodes 512-520 represent the calls between functions or code blocks.

In the depicted example, a traced section of the original code in FIG. 5A, as represented in the trace file 310, corresponds to instructions for only the "square" function, i.e. the function corresponding to node 516. After mapping the symbol information for the trace file 310, the CFG resolver 126 creates a CFG for the trace file 310, as illustrated by the box 530 surrounding the node 516 in FIG. 5C. The CFG of this sub-graph for the "square" function or code block may be similar to the CFG shown in FIG. 5A but specific to the internal code of the traced "square" function or code block. Moreover, as illustrated by the dashed box 540, all of the paths to the "square" function 516 are identified, which in the depicted example is only the path from the main function or code block node 512 to the "square" function or code block node 516.

Figure 5D:
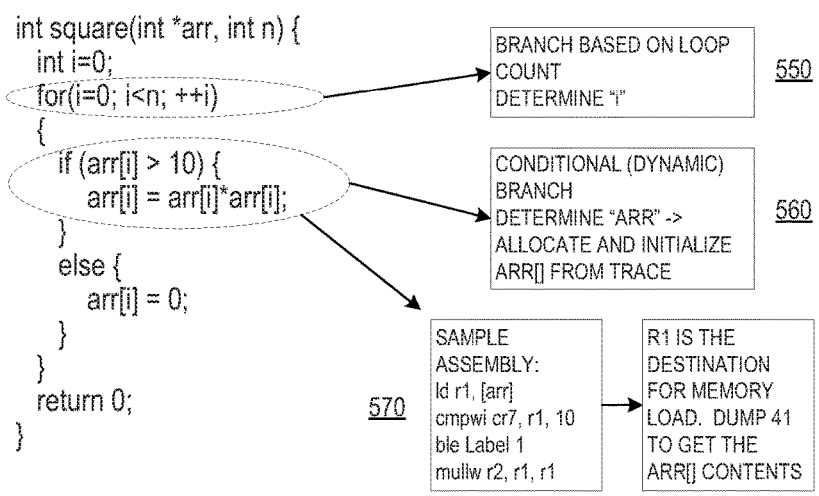

As shown in FIG. 5D, the trace analyzer 124 analyzes the trace file 310, generates a trace profile, and from the trace profile identifies the hot function(s) represented in the trace file 310 based on the trace profile data, e.g., hot function metrics. In the depicted example, the trace analyzer 124 identifies the "square" function 516 as the hot function in the trace file 310 based on hot function metrics in the trace profile. The trace analyzer 124 further identifies the variables and/or constructs of interest within the identified hot function(s). The register contents captured as part of the trace records are used to initialize the identified variables/memory for the reconstruction of the program. For example, in the "square" function 516 which is to be reconstructed in the new program, the important data initialization requirements are the loop count and conditional (dynamic) branch.

Initialization data for the hot function includes each of the dynamic data paths in the function as identified by the trace analyzer 124. Some of the initialization parameters, which are not dynamic, can directly be obtained from the original program, e.g., #defines, external variables, etc. can be carried over from the original program as is. As shown in FIG. 5D, the trace analyzer 124 identifies the branch based on the loop count for "i" 550, a conditional (dynamic) branch based on the variable "arr" 560 with sample assembly code for this conditional branch being shown in box 570 with the destination register R1 being able to be dumped to get the arr[ ] contents.

The analysis of the trace file and original binary file, the functions/program sections that need to be part of the reconstructed program are identified. Along with this information, the trace analyzer provides the information required for data initialization. Program reconstruction uses this information and creates an initialization routine. In this example, the reconstructed program will contain the "main" and the "square" function and an additional "init" function is added to initialize the loop count variable "n" and allocate and initialize "arr[ ]".

The illustrative embodiments provide mechanisms to convert short and compact representations of a problem area of the workload, or program code, in the form of a trace, to a high level program or micro-benchmark which can be analyzed or debugged easily, even in different hardware architectures. In addition, the illustrative embodiments provide significant advantages which cannot be accomplished in other known mechanisms. Some of these advantages include the following:

1. Binaries generated from trace files are useful to obtain performance measurement unit (PMU) data, or hardware performance metrics, for the traced section alone on the hardware which assists filtering and categorizing traces and future workloads based on those characteristics.
2. Gap analysis of hardware simulators and models comparing the trace execution on the models and binary execution for the traced section alone on the actual hardware may be obtained.
3. Specific performance aspects, such as new instruction set architectures (ISAs) or feature evaluations, captured as trace file information can be converted to compilable programs and used for competition analysis on multiple hardware architectures.
4. Light weight and problem focused micro-benchmarks reconstructed from trace files are free from the complex workload setup and are easier to analyze and debug, which is especially important when new hardware is released with missing ecosystems, i.e. software infrastructure required to use the new hardware.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions which are executed by the at least one processor to specifically configure the at least one processor to implement one or more elements of a conversion engine that operates to perform the method, the method comprising:

receiving, by the conversion engine, a trace file for an original program whose execution on computing hardware has been traced;

performing, by the conversion engine, analysis of the trace file to identify a hot function, symbol information corresponding to the hot function, and initialization parameters for the hot function;

generating, by the conversion engine, a trace control flow graph based on the identified hot function and the symbol information corresponding to the hot function;

identifying, by the conversion engine, based on the trace control flow graph, pathways in the original program to the hot function, represented in the trace file;

generating, by the conversion engine, a reconstructed program based on the trace control flow graph, the pathways to the hot function, and the initialization parameters; and outputting, by the conversion engine, the reconstructed program, wherein performing analysis of the trace file to identify a hot function comprises selecting a function, from one or more functions represented in the trace file, based on corresponding hot function metrics associated with the one or more functions, to be the hot function, wherein the hot function metrics comprise, for each function, a percentage of references to the function in the trace file, and wherein selecting the function based on corresponding hot function metrics associated with the one or more functions comprises selecting a function having a highest percentage of references to the selected function when compared to percentages of references of other functions in the one or more functions.

2. The method of claim 1, wherein performing analysis of the trace file comprises executing a symbol mapper on the trace file to correlate instruction addresses with corresponding symbols and thereby generate symbol information for the trace file.

3. The method of claim 1, wherein generating the reconstructed program comprises:

reconstructing a portion of the original program corresponding to the hot function;

reconstructing portions of the original program that are part of pathways to the hot function; and generating an initialization function, based on the initialization parameters, to initialize parameters for the hot function.

4. The method of claim 3, wherein the reconstructed program comprises only the portion of the original program corresponding to the hot function, portions of the original program that are part of the pathways to the hot function, and the initialization function, and other portions of the original program are not included in the reconstructed program.

5. The method of claim 1, wherein the trace control flow graph is a sub-graph of the program control flow graph.

6. The method of claim 1, wherein outputting the reconstructed program comprises debugging a hardware architecture used to generate the trace file at least by executing the reconstructed program on the hardware architecture that was used to generate the trace file.

7. The method of claim 1, wherein outputting the reconstructed program comprises at least one of executing the reconstructed program on a new hardware architecture different than that used to generate the trace file or compiling the reconstructed program with a new compiler different than a complier that was used to generate the binary file.

8. A method, in a data processing system comprising at least one processor and at least one memory, wherein the at least one memory comprises instructions which are executed by the at least one processor to specifically configure the at least one processor to implement one or more elements of a conversion engine that operates to perform the method, the method comprising:

receiving, by the conversion engine, a trace file for an original program whose execution on computing hardware has been traced;

performing, by the conversion engine, analysis of the trace file to identify a hot function, symbol information corresponding to the hot function, and initialization parameters for the hot function;

generating, by the conversion engine, a trace control flow graph based on the identified hot function and the symbol information corresponding to the hot function;

identifying, by the conversion engine, based on the trace control flow graph, pathways in the original program to the hot function, represented in the trace file;

generating, by the conversion engine, a reconstructed program based on the trace control flow graph, the pathways to the hot function, and the initialization parameters;

outputting, by the conversion engine, the reconstructed program;

receiving, by the conversion engine from a compiler, a binary code corresponding to the original program;

analyzing, by the conversion engine, the binary code to generate function information corresponding to the binary code; and generating, by the conversion engine, a program control flow graph of the entire original program based on the function information corresponding to the binary code, wherein identifying pathways to the hot function comprises comparing the program control flow graph to the trace control flow graph to identify at least one portion of the program control flow graph that invokes at least one portion of the trace control flow graph.

9. A computer program product comprising a computer readable storage medium having a computer readable program stored therein, wherein the computer readable program, when executed on a computing device, causes the computing device to be specifically configured to implement one or more elements of a conversion engine that operates to:

receive a trace file for an original program whose execution on computing hardware has been traced;

perform analysis of the trace file to identify a hot function, symbol information corresponding to the hot function, and initialization parameters for the hot function;

generate a trace control flow graph based on the identified hot function and the symbol information corresponding to the hot function;

identify based on the trace control flow graph, pathways in the original program to the hot function, represented in the trace file;

generate a reconstructed program based on the trace control flow graph, the pathways to the hot function, and the initialization parameters; and output the reconstructed program, wherein the computer readable program further causes the conversion engine of the computing device to perform analysis of the trace file to identify a hot function of the original program at least by selecting a function, from one or more functions represented in the trace file, based on corresponding hot function metrics associated with the one or more functions, to be the hot function, wherein the hot function metrics comprise, for each function, a percentage of references to the function in the trace file, and wherein the computer readable program further causes the conversion engine of the computing device to select the function based on corresponding hot function metrics associated with the one or more functions at least by selecting a function having a highest percentage of references to the selected function when compared to percentages of references of other functions in the one or more functions.

10. The computer program product of claim 9, wherein performing analysis of the trace file comprises executing a symbol mapper on the trace file to correlate instruction addresses with corresponding symbols and thereby generate symbol information for the trace file.

11. The computer program product of claim 9, wherein the computer readable program further causes the conversion engine of the computing device to generate the reconstructed program at least by:

reconstructing a portion of the original program corresponding to the hot function;

reconstructing portions of the original program that are part of pathways to the hot function; and generating an initialization function, based on the initialization parameters, to initialize parameters for the hot function.

12. The computer program product of claim 11, wherein the reconstructed program comprises only the portion of the original program corresponding to the hot function, portions of the original program that are part of the pathways to the hot function, and the initialization function, and other portions of the original program are not included in the reconstructed program.

13. The computer program product of claim 9, wherein the trace control flow graph is a sub-graph of the program control flow graph.

14. The computer program product of claim 9, wherein the computer readable program further causes the conversion engine of the computing device to output the reconstructed program comprises at least one of:

debugging a hardware architecture used to generate the trace file at least by executing the reconstructed program on the hardware architecture that was used to generate the trace file;

executing the reconstructed program on a new hardware architecture different than that used to generate the trace file; or compiling the reconstructed program with a new compiler different than a complier that was used to generate the binary file.

15. A computer program product comprising a computer readable storage medium having a computer readable program stored therein, wherein the computer readable program, when executed on a computing device, causes the computing device to be specifically configured to implement one or more elements of a conversion engine that operates to:

receive a trace file for an original program whose execution on computing hardware has been traced;

perform analysis of the trace file to identify a hot function, symbol information corresponding to the hot function, and initialization parameters for the hot function;

generate a trace control flow graph based on and the identified hot function the symbol information corresponding to the hot function;

identify based on the trace control flow graph, pathways in the original program to the hot function, represented in the trace file;

generate a reconstructed program based on the trace control flow graph, the pathways to the hot function, and the initialization parameters;

output the reconstructed program;

receive, from a compiler, a binary code corresponding to the original program;

analyze the binary code to generate function information corresponding to the binary code; and generate a program control flow graph of the entire original program based on the function information corresponding to the binary code, wherein the computer readable program further causes the conversion engine of the computing device to identify pathways to the hot function at least by comparing the program control flow graph to the trace control flow graph to identify at least one portion of the program control flow graph that invokes at least one portion of the trace control flow graph.

16. An apparatus comprising:

a processor; and a memory coupled to the processor, wherein the memory comprises instructions which, when executed by the processor, cause the processor to:

receive a trace file for an original program whose execution on computing hardware has been traced;

perform analysis of the trace file to identify a hot function, symbol information corresponding to the hot function, and initialization parameters for the hot function;

generate a trace control flow graph based on the identified hot function and the symbol information corresponding to the hot function;

identify based on the trace control flow graph, pathways in the original program to the hot function, represented in the trace file;

generate a reconstructed program based on the trace control flow graph, the pathways to the hot function, and the initialization parameters; and output the reconstructed program, wherein the instructions further cause the processor to perform analysis of the trace file to identify a hot function of the original program at least by selecting a function, from one or more functions represented in the trace file, based on corresponding hot function metrics associated with the one or more functions, to be the hot function, wherein the hot function metrics comprise, for each function, a percentage of references to the function in the trace file, and wherein the instructions further cause the processor to select the function based on corresponding hot function metrics associated with the one or more functions at least by selecting a function having a highest percentage of references to the selected function when compared to percentages of references of other functions in the one or more functions.

17. An apparatus comprising:
a processor; and
a memory coupled to the processor, wherein the memory comprises instructions which, when executed by the processor, cause the processor to:

receive a trace file for an original program whose execution on computing hardware has been traced;

perform analysis of the trace file to identify a hot function, symbol information corresponding to the hot function, and initialization parameters for the hot function;

generate a trace control flow graph based on the identified hot function and the symbol information corresponding to the hot function;

identify based on the trace control flow graph, pathways in the original program to the hot function, represented in the trace file;

generate a reconstructed program based on the trace control flow graph, the pathways to the hot function, and the initialization parameters;

output the reconstructed program;

receive, from a compiler, a binary code corresponding to the original program;

analyze the binary code to generate function information corresponding to the binary code; and generate a program control flow graph of the entire original program based on the function information corresponding to the binary code, wherein the instructions further causes the processor to identify pathways to the hot function at least by comparing the program control flow graph to the trace control flow graph to identify at least one portion of the program control flow graph that invokes at least one portion of the trace control flow graph.

* * * * *